US00RE40895E

(19) United States
(12) Reissued Patent
Hayashi et al.

(10) Patent Number: US RE40,895 E
(45) Date of Reissued Patent: Sep. 1, 2009

(54) OPTICAL HEAD AND APPARATUS FOR AND METHOD OF STORING AND REPRODUCING OPTICAL INFORMATION

(75) Inventors: Hideki Hayashi, Nara (JP); Joji Anzai, Suita (JP)

(73) Assignee: Panasonic Corporation, Osaka (JP)

(21) Appl. No.: 11/705,086

(22) Filed: Feb. 12, 2007

Related U.S. Patent Documents

Reissue of:
(64) Patent No.: 6,680,894
Issued: Jan. 20, 2004
Appl. No.: 09/974,914
Filed: Oct. 12, 2001

(30) Foreign Application Priority Data

Oct. 13, 2000 (JP) ..... 2000-313673

(51) Int. Cl.
*G11B 7/00* (2006.01)

(52) U.S. Cl. ..... 369/112.01; 369/44.23; 369/44.27

(58) Field of Classification Search ..... None
See application file for complete search history.

(56) References Cited

U.S. PATENT DOCUMENTS 5,627,814 A * 5/1997 Lee ..... 369/116
5,995,473 A * 11/1999 Choi ..... 369/112.19
6,304,540 B1 10/2001 Yoo et al.
6,430,138 B2 8/2002 Chang et al.
6,452,880 B1 9/2002 Kawamura et al.
6,552,990 B1 4/2003 Kajiyama et al.
6,721,242 B2 * 4/2004 Ohnishi et al. ..... 369/44.26

FOREIGN PATENT DOCUMENTS

CN 1235689 A 11/1999
WO 98/19303 5/1998

* cited by examiner

*Primary Examiner*—Muhammad Edun
(74) *Attorney, Agent, or Firm*—Wenderoth, Lind & Ponack, L.L.P.

(57) ABSTRACT

In a optical head, a beam is emitted from a light emitting element in which a plurality of light sources are integrally formed, the light sources being able to emit beams having different wave lengths from one another. An optical system converges the beam coming from any one of the light sources onto an optical information storage medium. An optical separator separates a reflected beam coming from the optical information storage medium from the beam coming from the light source. A light receiving element detects light quantities of the reflected beam separated by the optical separator.

7 Claims, 10 Drawing Sheets

OPTICAL HEAD AND APPARATUS FOR AND METHOD OF STORING AND REPRODUCING OPTICAL INFORMATION

Matter enclosed in heavy brackets [ ] appears in the original patent but forms no part of this reissue specification; matter printed in italics indicates the additions made by reissue.

*This is a reissue application of U.S. Pat. No. 6,680,894, issued Jan. 20, 2004.*

This application is based on the patent application No. 2000-313673 filed in Japan, the contents of which are hereby incorporated by reference.

BACKGROUND OF THE INVENTION

1. Field of the Invention

The present invention relates to an optical head, and an apparatus for and a method of storing and reproducing optical information.

2. Description of the Related Art

An optical storage technique using an optical disk with a pattern of a pit shape, which is one of information storage media of high densities and mass storage volumes, is increasing its applications such as a digital audio disk, a video disk, a document file disk and further a data file. In the optical storage technique, the information is stored (recorded) and reproduced with high accuracy and reliability by applying a minutely condensed light beam onto the optical disk. The storing or reproducing action solely depends on the optical system. Fundamental functions of an optical head, which is a main portion of the optical system, are roughly divided into convergence for forming a minute spot of diffraction limit, focus control and tracking control of the optical system, and detection of pit signals. These functions are achieved by combining any one of various optical systems with any one of various photoelectric transferring and detecting methods in accordance with the object and use of the optical system.

On the other hand, in recent years, an optical disk of high density and mass storage volume, which is a called DVD, has been put to practical use and highlighted as an information storage medium which can treat a very large volume of information such as moving images. In the DVD optical disk, the pit size on the surface for storing information is reduced in order to increase its storing density in comparison with that of a compact disk (shortly referred to "CD" hereinafter) which is one of conventional optical disks. Accordingly, in the optical head for storing and reproducing information on the DVD optical disk, its wave length of the light source defining the spot diameter or its numerical aperture (shortly referred to "NA" hereinafter) of the convergent lens is different from that of the CD. In this connection, as for the CD, the wave length of the light source is set to about 0.78 μm while the NA is set to about 0.45. On the other hand, as for the DVD optical disk, the wave length of the light source is set to about 0.63–0.65 μm while the NA is set to about 0.6. Therefore, in order to store or reproduce the information for the two kinds of optical disks of the CD and the DVD using one optical disk drive, the optical head is required to have two optical systems. On the other hand, because the optical head is required to be small, thin and inexpensive, there is such a tendency that parts of the optical systems of the CD and the DVD are used in common to the best of their ability. For example, a technique may be used such that only one light source for the DVD is used while two kinds of convergent lenses for the DVD optical disk and the CD are used. Further, it may be also used such a technique that only one convergent lens is used in common, and then the NA is mechanically or optically changed such that the NA is set to a larger value when the DVD optical disk is used while the NA is set to a smaller value when the CD is used.

Meanwhile, in order to reproduce a CD-R which is rapidly and increasingly prevailing in recent years, there has been widely produced an optical head with light sources having wave lengths which are optimized for the DVD and the CD (CD-R), respectively. In FIG. 10, there is shown an example of an interchangeable optical head for reproducing the DVD and CD-R. In the optical head, the interchangeability between the DVD and the CD is achieved by using a convergent lens including a portion optimized for the DVD and another ring-shaped portion optimized for the thickness of the CD, and by using a light source for the CD and another light source for the DVD.

Hereinafter, the optical head will be described with reference to drawings. As shown in FIG. 10, in the optical head, on an optical path between a disk 8 (i.e., DVD 8a or CD 8b) and a photo detector 54, there are disposed an objective lens 7, a collimator lens 3, a rising mirror 9 and beam splitters 5, 6. A light source 51 for reproducing the DVD is disposed on an optical path which is diverged from the beam splitter 5 while another light source 52 for reproducing the CD is disposed on an optical path which is diverged from the beam splitter 6. In the optical head, the objective lens 7 has a shape to be able to form a spot having a size which is optimized for both of the DVD 8a and the CD 8b, the thickness of the base material of the DVD being smaller, and the thickness of the base material of the CD being larger (see FIGS. 5A and 5B). Meanwhile, the beam splitter 5 is composed of a plate having surfaces parallel to each other (parallel plate). As for both of a light beam 62a for reproducing the DVD 8a and a light beam 62b for reproducing the CD 8b, the reflected light beams of those generate astigmatism in the beam splitter 5. The DVD 8a is reproduced while composing the photo an detector 54 of a quartered detector and using the so-called astigmatism method as the focus error detecting method. Hereupon, as the tracking detecting method, the so-called phase difference method is used if the DVD 8a is a DVD-ROM while the push-pull method is used if the DVD 8a is DVD-RAM. In this connection, as the tracking method for the CD 8b, the so-called three beam method is generally used using diffracted light which is generated by a grating (diffraction grating) 60 disposed between the light source 52 for the CD and the beam splitter 6. Moreover, in order to stabilize the push-pull signals of the DVD-RAM, it is also suggested to use the so-called differential push-pull (DPP) method using diffracted light which is generated by a grating 59 disposed between the light source 51 for the DVD and the beam splitter 5, as same as the case of reproducing the CD 8b.

However, in the conventional interchangeable optical head using the respective light sources for the DVD and the CD, it is required to provide at least two beam splitters. Meanwhile, if different tracking error detecting methods are used for the DVD and the CD, respectively, namely if the DPP method is used for reproducing the DVD while the three beam method is used for reproducing the CD, it is required that respective optical elements with diffraction gratings are provided for both of the DVD and the CD. Therefore, the above-mentioned matters prevent the optical head from being made smaller or more inexpensive.

SUMMARY OF THE INVENTION

The present invention has been developed to solve the conventional problems described above and has an object to provide a small and inexpensive optical element of an optical head.

An optical head according to the present invention includes (i) a light emitting element in which a plurality of light sources are integrally formed, the light sources being able to emit beams having different wave lengths to one another, (ii) an optical system for converging a beam emitted by any one of the light sources of the light emitting element onto an optical information storage medium, (iii) an optical separator for separating a reflected beam coming from the optical information storage medium from the beam coming from the light source, and (iv) a light receiving element for detecting light quantities of the reflected beam separated by the optical separator.

In the above-mentioned optical head, the optical separator separates the reflected beam coming from the optical information storage medium from the beam coming from the light source by means of reflection and transmission of the beam.

Further, in the above-mentioned optical head, an aligning direction of the light sources preferably inclines by about 45 degrees in a rotational direction around an axis of the beam coming from the light source on the basis of a reflection axis of the optical separator.

Moreover, in the above-mentioned optical head, the light receiving element for receiving a zero-order-diffracted light, which is located at a central position, is preferably composed of regions of at least a number equal to four times of a number of the light sources, the regions being composed of region sets each of which includes four regions, each of the sets receiving the reflected beam which has been emitted by the light source and then reflected by the optical information storage medium.

Further, in the above-mentioned optical head, the optical separator is preferably composed of a parallel plate, that is a plate having surfaces parallel to each other.

In addition, the above-mentioned optical head further includes an optical element disposed between the light sources and the optical system, which includes two kinds of diffraction gratings disposed on front and back portions thereof. Hereupon, depths, pitches and angles for the axis of the beams of the two kinds of diffraction gratings are different from each other, respectively.

An apparatus for storing and reproducing optical information according to the present invention includes (i) a light emitting element in which a plurality of light sources are integrally formed, the light sources being able to emit beams having different wave lengths to one another, (ii) an optical system for converging a beam emitted by any one of the light sources of the light emitting element onto an optical information storage medium, (iii) an optical separator for separating a reflected beam coming from the optical information storage medium from the beam coining from the light source, (iv) a light receiving element for detecting light quantities of the reflected beam separated by the optical separator, and (v) an electric circuit for transforming optical signals detected by the light receiving element to electric signals so as to output signals stored in the optical information storage medium as the electric signals.

A method of storing and reproducing optical information according to the present invention, for an apparatus for storing and reproducing the optical information with an optical head, the optical head including (i) a light emitting element in which a plurality of light sources are integrally formed, the light sources being able to emit beams having different wave lengths to one another, (ii) an optical system for converging a beam emitted by any one of the light sources of the light emitting element onto an optical information storage medium, (iii) an optical separator for separating a reflected beam coming from the optical information storage medium from the beam coming from the light sources and (iv) a light receiving element for detecting light quantities of the reflected beam separated by the optical separator, includes the steps of (a) identifying the kind of the optical information storage medium, (b) making the light emitting element emit the beam having wave length corresponding to the identified kind of the optical information storage medium and then covering the beam onto the optical information storage medium, and (c) detecting the reflected beam coming from the optical information storage medium and then outputting signals stored in the optical information storage medium as electric signals.

DESCRIPTION OF THE DRAWINGS

Various characteristics and advantages of the present invention will become clear from the following description taken in conjunction with the preferred embodiments with reference to the accompanying drawings throughout which like parts are designated by like reference numerals, in which.

DETAILED DESCRIPTION OF THE PREFERRED EMBODIMENTS

Figure 1:
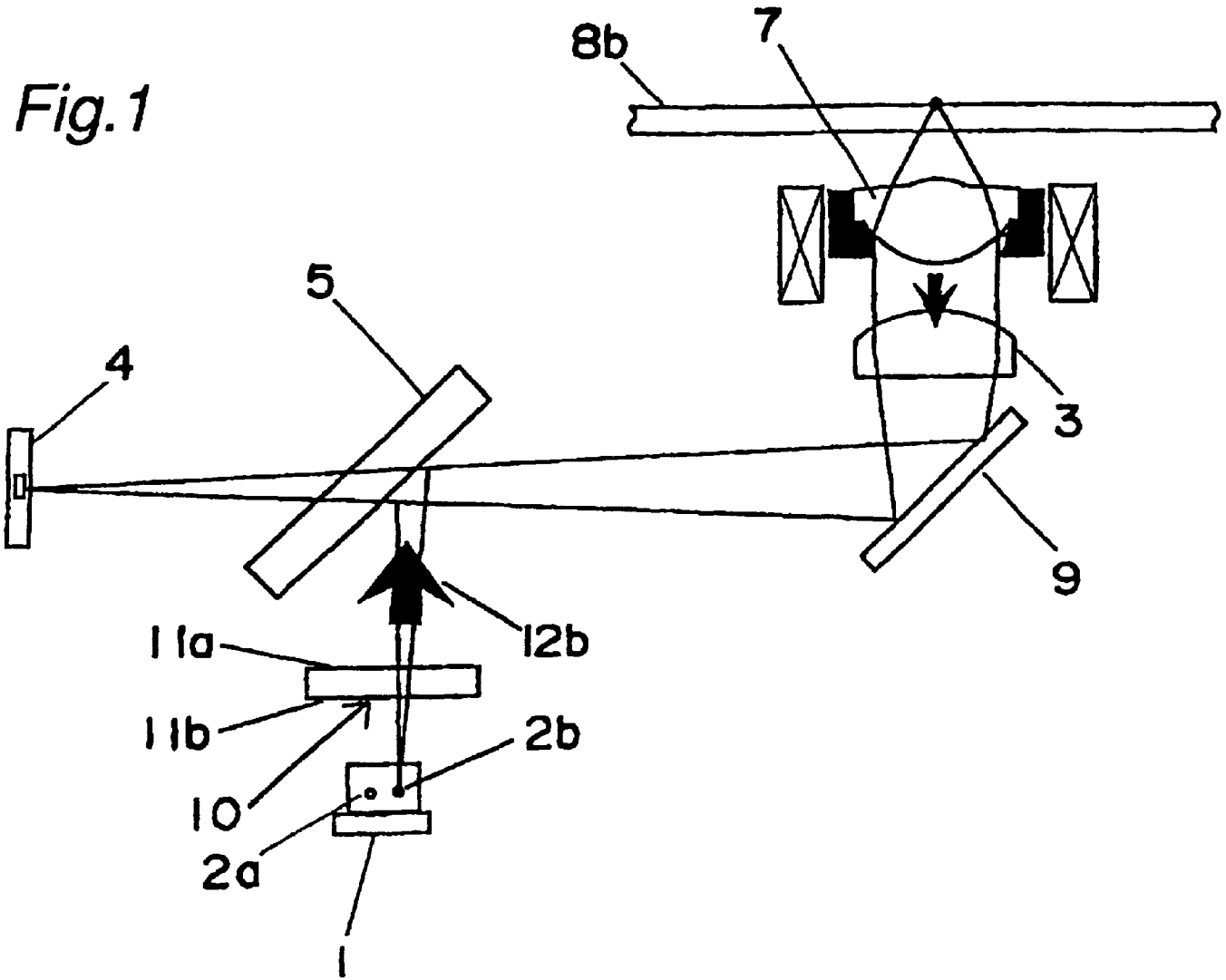
FIG. 1 is a schematic section view of an optical head when a CD is reproduced.

Hereinafter, an embodiment of the present invention will be described with reference to the accompanying drawings. In the drawings, like parts are designated by like reference numerals.

Figure 10:
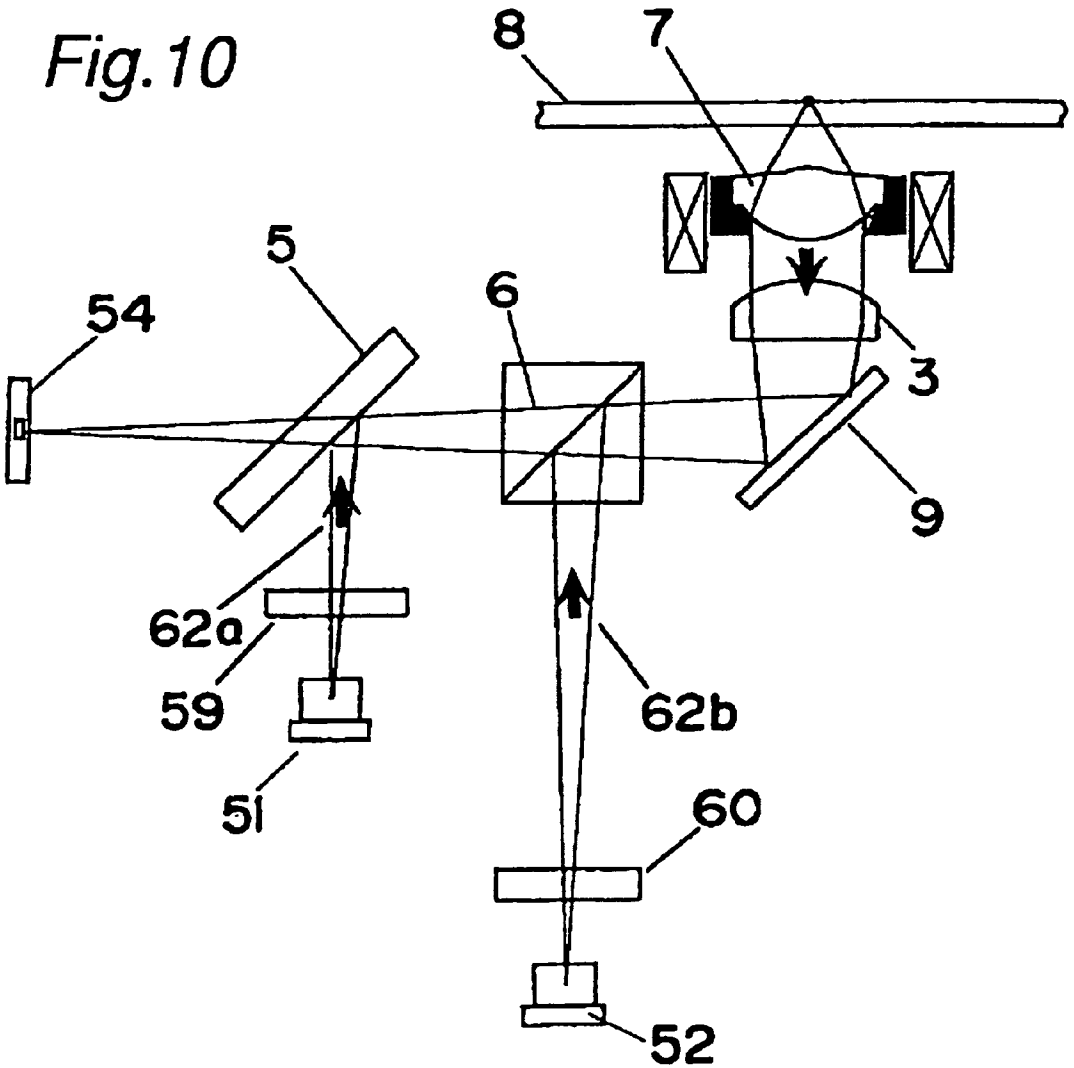
FIG. 10 is a schematic section view of an optical system in a conventional optical head.

An optical head according to the embodiment of the present invention is an interchangeable optical head for a DVD and a CD. In the optical head, there are used one light emitting element in which a plurality of light sources for the DVD and the CD are integrally formed therewith, and a convergent lens in which a portion thereof is optimized for the DVD while another ring-shaped portion thereof is optimized for the CD (or the thickness of the base material of the CD) so that interchangeability between the DVD and the CD is achieved. Hereinafter, the optical head according to the present embodiment will be described with reference to FIGS. 1 to 4, each of which shows the constriction of an optical system of the optical head. In those figures, the members common with those in FIG. 10 are given the same reference numerals as those in FIG. 10.

In the optical head, on an optical path between an optical disk 8 (i.e., DVD 8a or CD 8b) and a photo detector 4, there are provided an objective lens 7, a collimator lens 3 and a beam splitter 5. Further, a dual channel semiconductor laser 1, in which a light source 2a for reproducing the DVD and a light source 2b for reproducing the CD are integrally formed therewith, is disposed on an optical path which is diverged from the beam splitter 5. In the optical head also, the respective light sources 2a, 2b for the DVD and the CD are used as same as the conventional case. However, in the optical head according to the present embodiment, the dual channel semiconductor laser 1 in which the light sources 2a, 2b having respective wave lengths are integrated, is used as different from the conventional case. Corresponding to that, only the one beam splitter 5 is used as the optical separator.

Figure 5B:
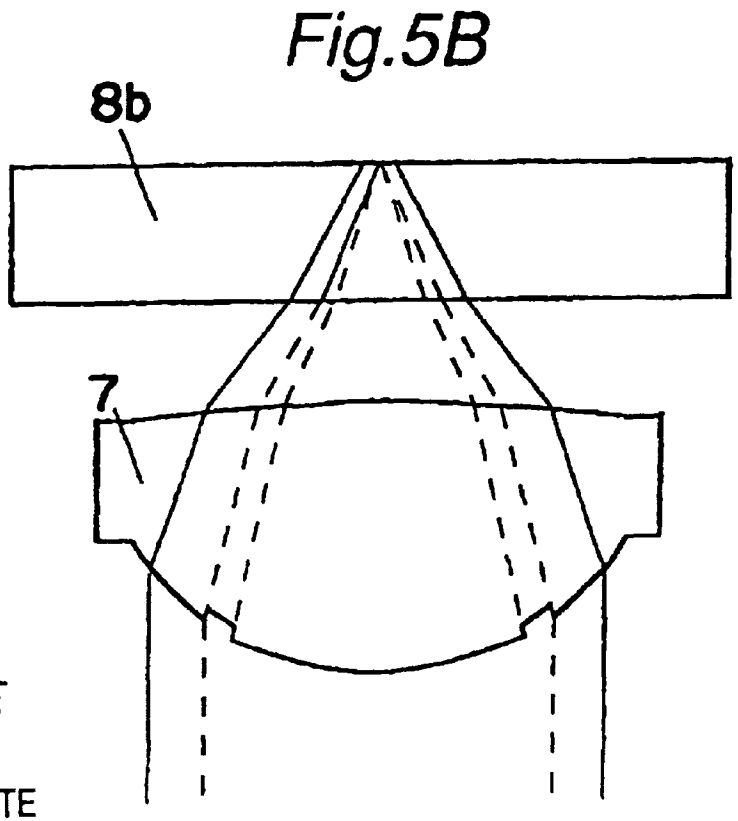
FIGS. 5A and 5B are views showing functions of objective lenses.
Figure 5A:
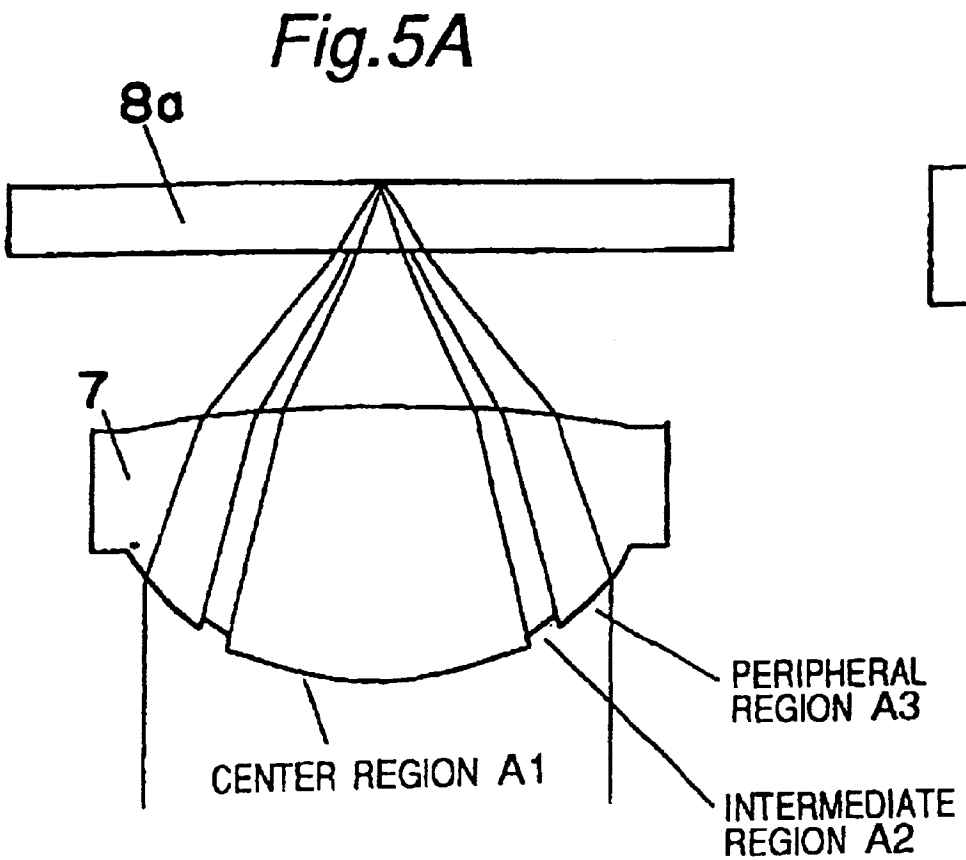

The objective lens 7 is a convergent lens, which is fundamentally optimized for the DVD. However, a portion of the objective lens 7 (convergent lens), which is formed of a ring-shaped zone, is optimized for the thickness of the base material of the CD. This feature is as same as that of the conventional case. Referring to FIGS. 5A and 5B, a specific portion is provided at least on the input plane or output plane of the objective lens 7 (position different from that of the ordinary lens). In the specific portion, there is provided a doughnut-shaped or ring-shaped intermediate region A2 having an outer diameter which is smaller than the overall effective diameter of the lens for the region through which the light passes. Further, a center region A1 is provided at the inner side of the intermediate region A2 while a peripheral region A3 is provided at the outer side of the intermediate region A2. The curvature of each of the center region A1 and the peripheral region A3 is optimized for the DVD 8a in which the thickness of the base material thereof is smaller. The curvature of the intermediate region A2 is optimized for the CD 8b in which the thickness of the base material thereof is larger. The intermediate region A2 may be divided into a plurality of sub-regions in accordance with circumstances. It is preferable that the photo detector 4 is designed such that light in the far axis region does not reach the photo detector 4 when the information in the CD 8b having a larger thickness is reproduced, namely the light reaches only the center region A1 and the intermediate region A2 of the objective lens 7.

Accordingly, as shown by broken lines in FIG. 5B, when the information is stored or reproduced to or from the CD 8b having the thick base material, the light beam having the wave length of 780 nm for reproducing the CD, coming from the light source 52 for reproducing the CD passes through the center region A1 and the intermediate region A2 and then converged onto the CD 8b. On that occasion, even if the curvature of the center region A1 corresponding to the near axis region is optimized for the thin DVD 8a, occurrence of spherical aberration is reduced because the near axis light passes near the center axis of the lens. Thus, when the information is stored or reproduced to or from the DVD 8a, the beam having the wave length of 650 nm for reproducing the DVD, coming from the light source 51 for reproducing the DVD passes through the center region A1 and the peripheral region A3 each of which has the optimized curvature for the thin disk, and then forms a focus on the surface with the information of the thin disk 8a. If the numerical aperture (NA) of the region corresponding to the near axis region and the far axis region of the objective lens 7 is set to about 0.45, smaller spots can be formed on the thick disk so that there can be formed spots having sizes which are optimized for the CD.

Hereupon, the beam splitter is composed of at optical member (i.e., parallel plate) of a plate shape having planes parallel to each other. The light passing through the beam splitter 5 causes an astigmatism.

Figure 2:
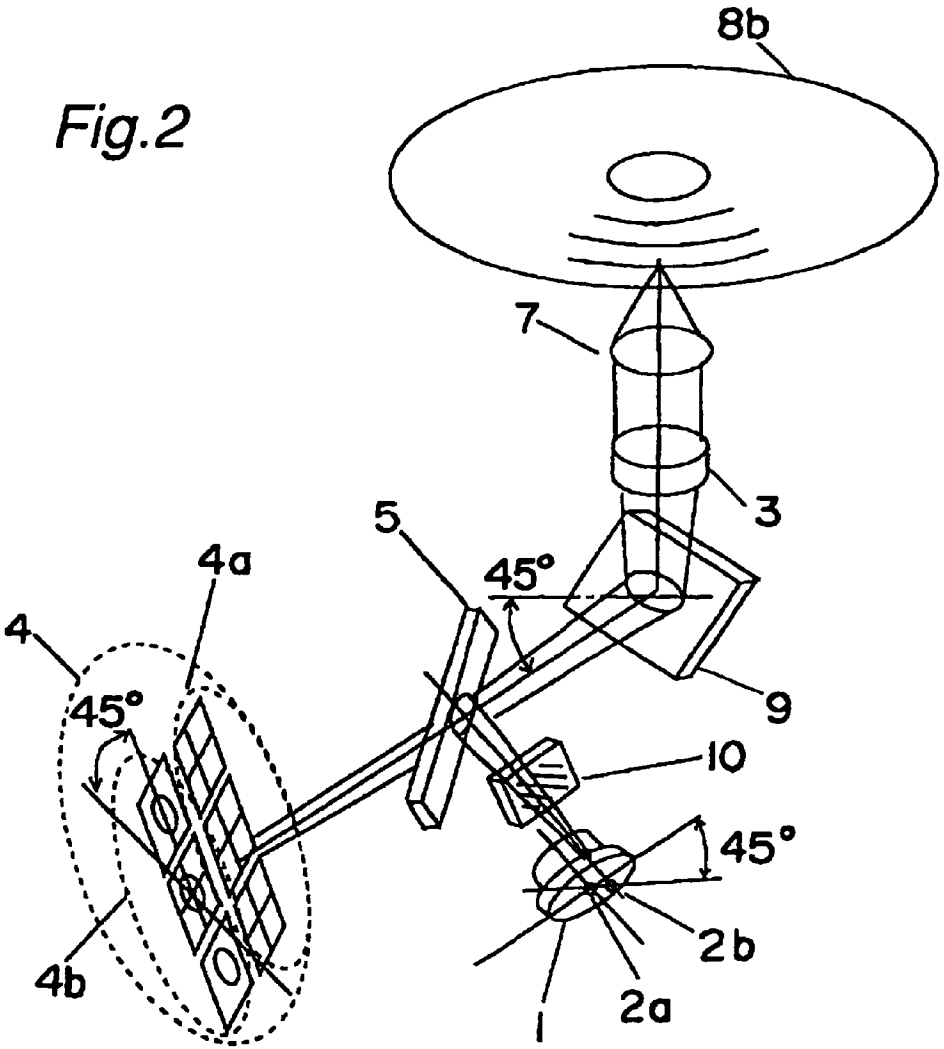
FIG. 2 is a schematic perspective view of the optical head when the CD is reproduced.

FIGS. 1 and 2 show such a state that the CD 8b, in which the thickness of the base material thereof is larger, is reproduced. A beam 12b coming from the light source 2b in the semiconductor laser 1, which emits the beam with the wave length of 780 nm for the CD, is reflected by the beam splitter 5 and the rising mirror 9 in turn, transformed to a parallel beam by the collimator lens 3, and then converged onto the CD 8b by the objective lens 7. The principle that the beam is converged onto the CD 8b, is the same as that of the conventional case. Therefore, it is possible to form spots having sizes which are optimized for the CD 8b.

When the CD 8b is reproduced also, the reflected beam coming from the CD 8b reaches the beam splitter 5 through the objective lens 7, collimator lens 3 and the rising mirror 9. On that occasion, the astigmatism is caused in the beam splitter 5. The reflected beam passes through the beam splitter 5 and then reaches the photo detector 4. The light receiving section of the photo detector 4, which receives the light for reproducing the CD is composed of a quartered detector of rectangular shape so that the signal for detecting the focus error is generated by means of the so-called astigmatism method.

Meanwhile, the so-called three-beam method is used as the procedure for detecting the tracking error when the CD 8b is reproduced. Each of three beams is a diffracted beam which is generated by a grating 11b formed on a primary surface side of a grating element 10 disposed between the semiconductor laser 1 and the beam splitter 5.

Figure 8:
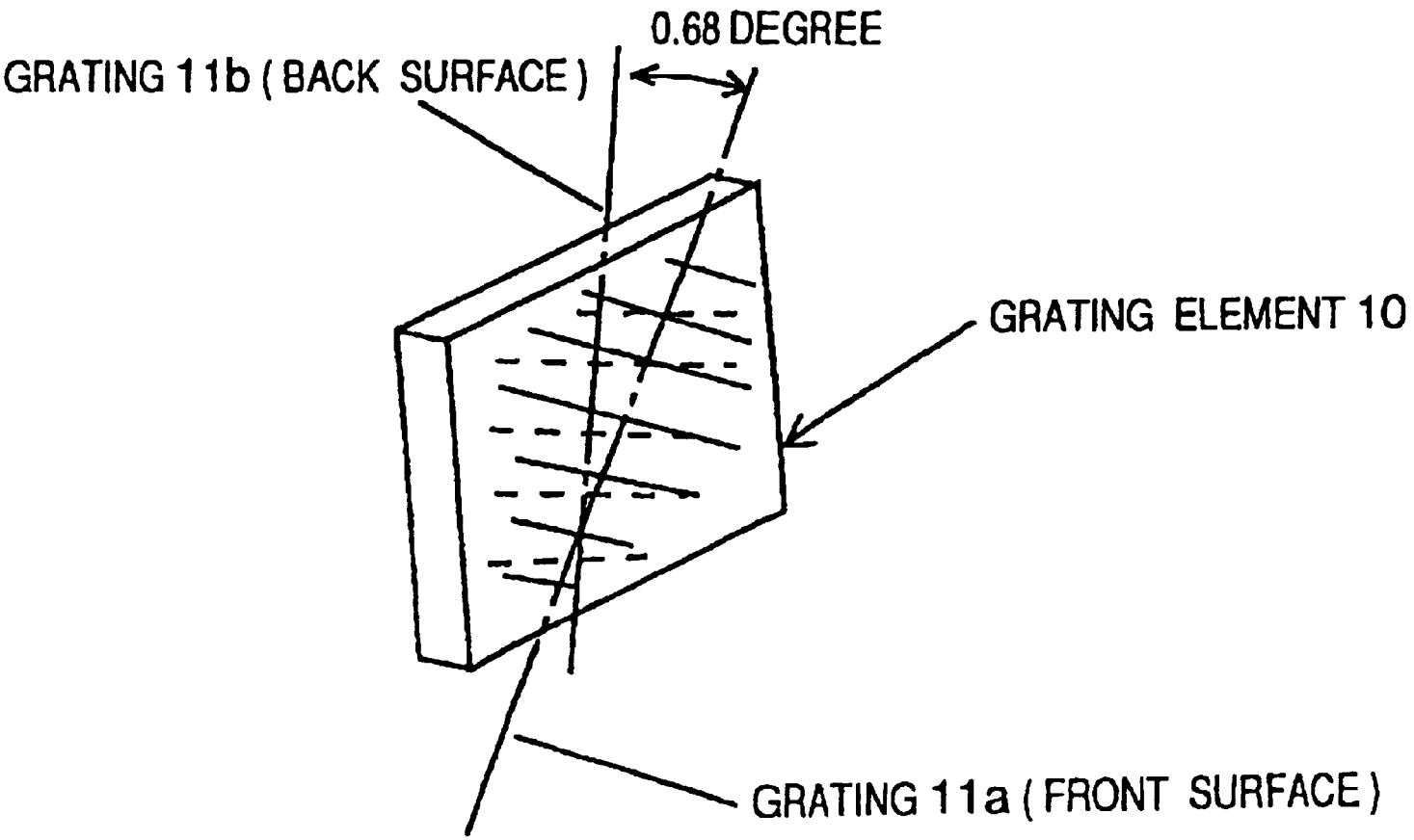
FIG. 8 is a perspective view showing a detailed construction of a grating element.

A detailed construction of the grating element 10 is shown in FIG. 8.

Figure 3:
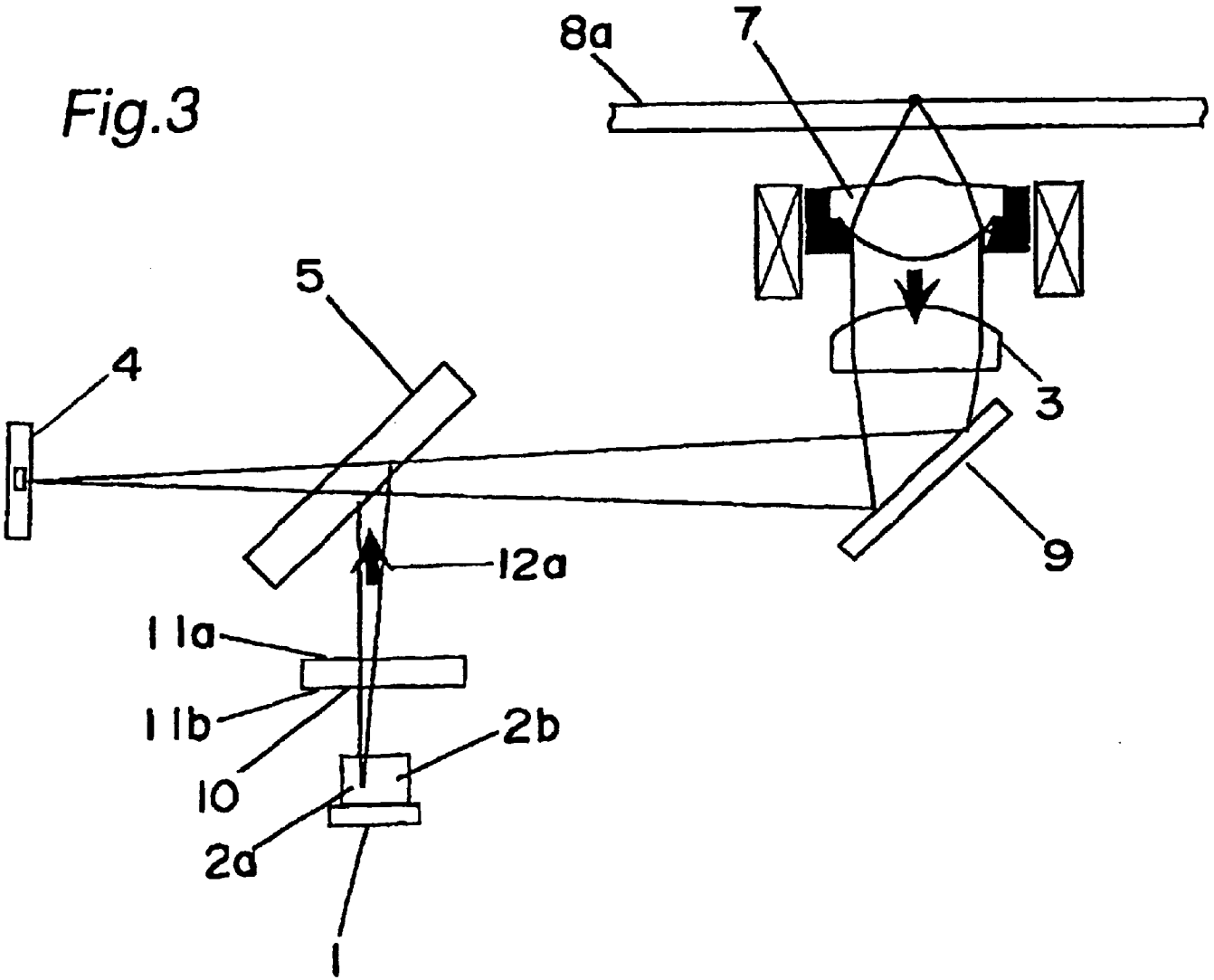
FIG. 3 is a schematic section view of the optical head when a DVD is reproduced.
Figure 4:
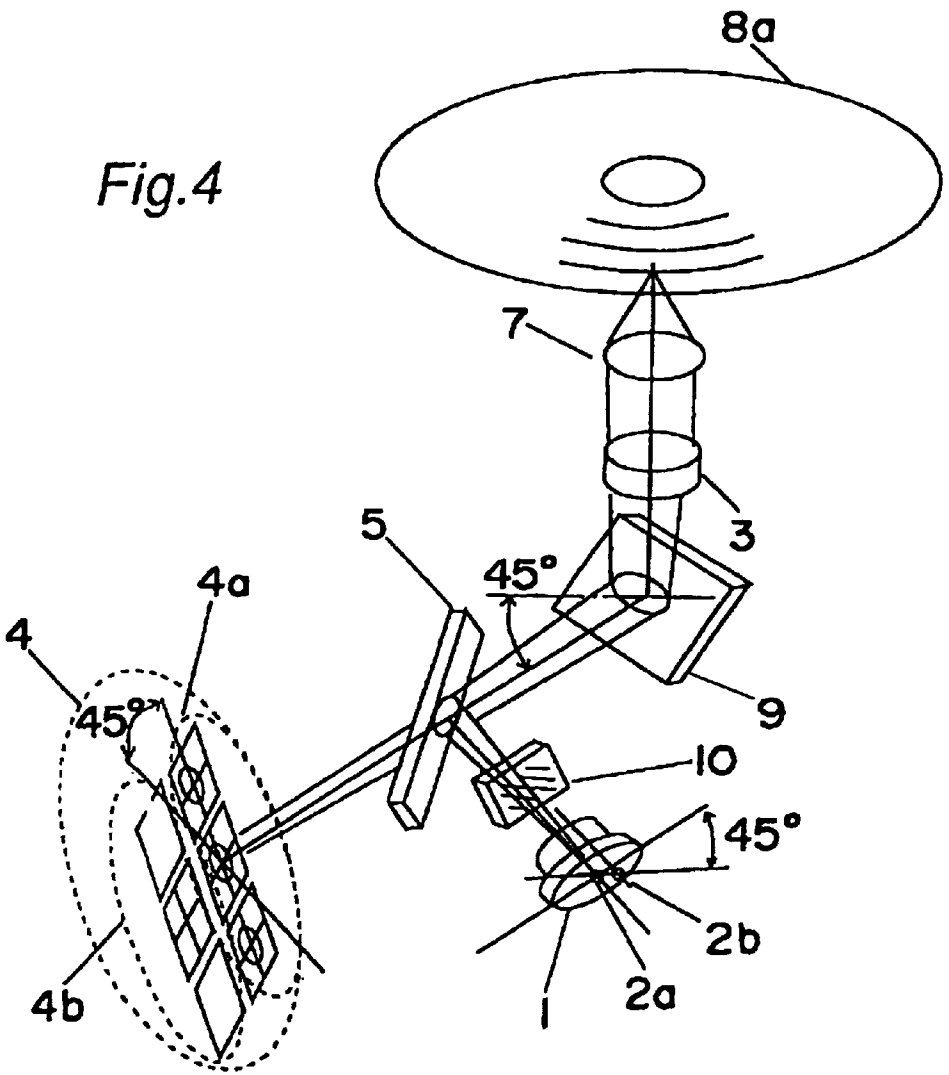
FIG. 4 is a schematic perspective view of the optical head when the DVD is reproduced.

FIGS. 3 and 4 show such a state that the DVD 8a, in which the thickness of the base material thereof is smaller, is recorded or reproduced. A beam 12a coming from the light source 2a in the semiconductor laser 1, which emits the beam with the wave length of 650 nm for the DVD, is converged onto the DVD 8a through the beam splitter 5, the rising mirror 9, collimator lens 3 and the objective lens 7 in turn, the same as the case of reproducing the CD. On that occasion, the principle that the beam is converged onto the DVD 8a, is the same as that of the conventional case. Therefore, it is possible to form spots having sizes which are optimized for the DVD 8a. Because the beam splitter 5 is composed of the parallel plate, the reflected beam coming from the DVD 8a also causes the astigmatism when it passes through the beam splitter 5, the same as the case of reproducing the CD 8b. The light receiving section of the photo detector 4, which receives the light for reproducing the DVD is composed of a quartered detector of rectangular shape so that the signal for detecting the focus en or is generated by means of the so-called astigmatism method. Hereupon, as the tracking detecting method, the so-called phase difference method is used if the DVD 8a is a DVD-ROM while the push-pull method is used if the DVD 8a is DVD-RAM.

Further, in order to stabilize the push-pull signal of the DVD-RAM, the so-called differential push-pull (DPP) method is used. In the DPP method, there is used a diffracted beam which is generated by a grating 11a formed on a secondary surface side of the grating element 10 disposed between the semiconductor laser 1 and the beam splitter 5.

In the photo detector 4, the light receiving element for receiving a zero-order diffracted light, which is located at a central position, is composed of light receiving regions of at least a number equal to four times of a number of the light sources. Hereupon, on both sides of the light receiving element for receiving the zero-order diffracted light, the light receiving element for receiving the positive first-order diffracted light and the light receiving element for receiving the negative first-order diffracted light are disposed, respectively (i.e., one by one). In the light receiving element, the light receiving regions are composed of region sets each of which includes four light receiving regions. Thus, the light receiving regions are arranged so as to receive the reflected beam which has been emitted by the light source and then reflected by the optical disk. The photo detector 4 may be, for example, a quartered detector. As shown in FIGS. 2 and 4, in the photo detector 4, the light receiving section 4b for receiving the CD reproducing beam and the light receiving section 4a for receiving the DVD reproducing beam are arranged in such a manner that the six photo detecting elements make a matrix composed of two columns and three rows. Hereupon, these are arranged in such a manner that the parting lines for forming the quartered detectors of rectangular shapes are continuously connected to one another. By arranging the light receiving sections as described above, the sizes of the quartered detectors can be increased in relation to the interval between the light spot of the CD reproducing beam and the light spot of the DVD reproducing beam so that the extent which can detect the focus signal is increased.

If the detectors are arranged as described above, the aligning direction of the light spot of the CD reproducing beam and the light spot of the DVD reproducing beam becomes parallel to the above-mentioned parting lines of the detectors. Accordingly, it is preferable that the aligning direction inclines by 45 degrees in the rotational direction around the optical axis of the reproducing beam, in relation to the parallel plate 5 which causes the astigmatism. That is, it is necessary that in the semiconductor laser 1, the aligning direction of the light source 2a having the wave length for the DVD and the light source 2b having the wave length for the CD inclines by 45 degrees in the rotational direction around the axis of the emitted beam in relation to the parallel plate 5.

Meanwhile, because the so-called phase difference method is used as the procedure for detecting the tracking error during the reproducing process of the DVD-ROM while the push-pull method is used as the procedure for detecting the tracking error during the reproducing process of the DVD-RAM, it is necessary that the transferred track image on the photo detector 4a for reproducing the DVD (the image of the pit arrays in the DVD 8a which is transferred onto the photo detector 4a) is parallel to the parting lines for forming the quartered detectors of the photo detector 4a. Therefore, the optical axis extending from the rising mirror 9 to the photo detector 4a through beam splitter 5 is disposed in the direction inclined by 45 degrees in relation to the track of the DVD 8a (pit array).

Figure 6:
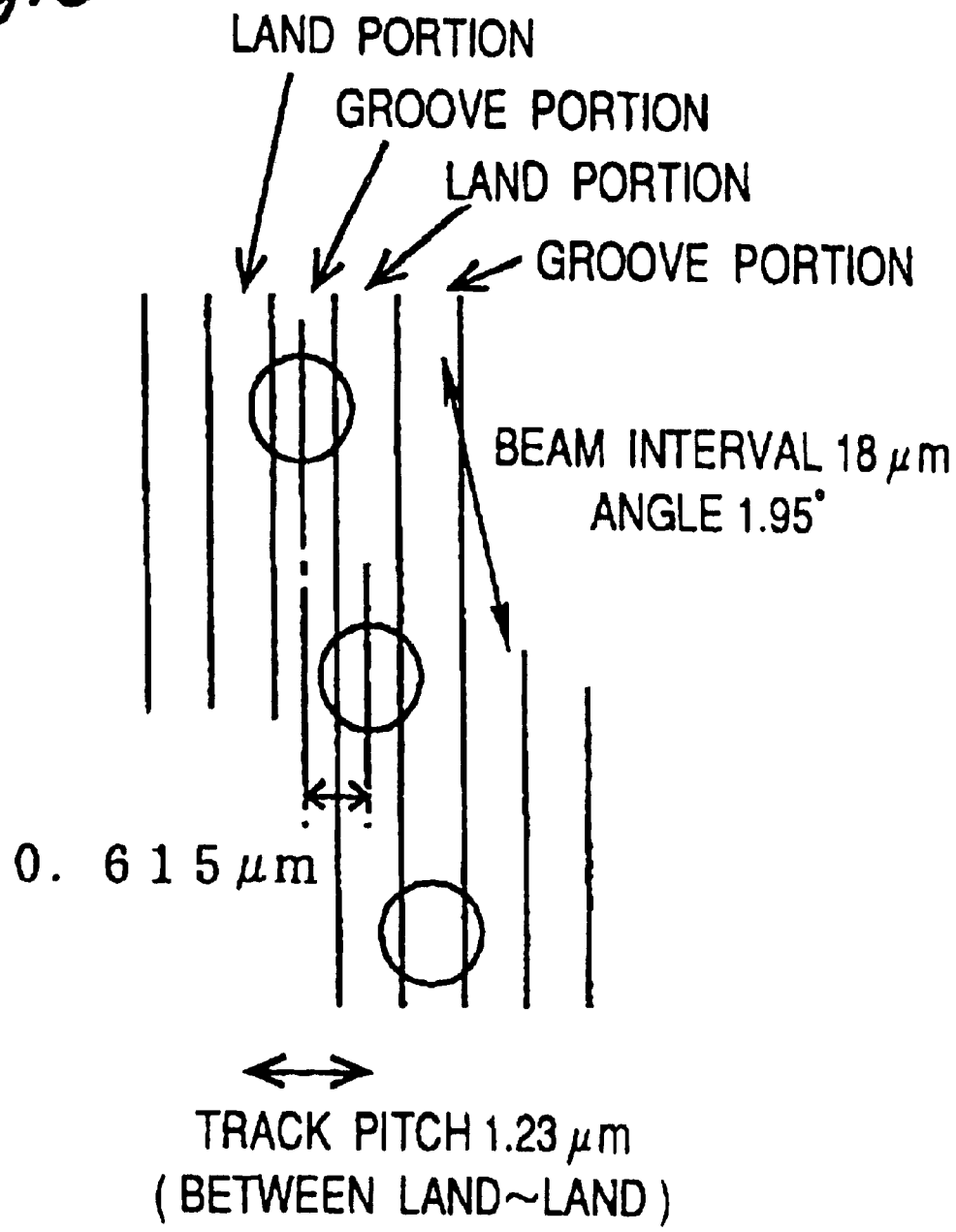
FIG. 6 is a view showing positions of spots on the DVD.
Figure 7:
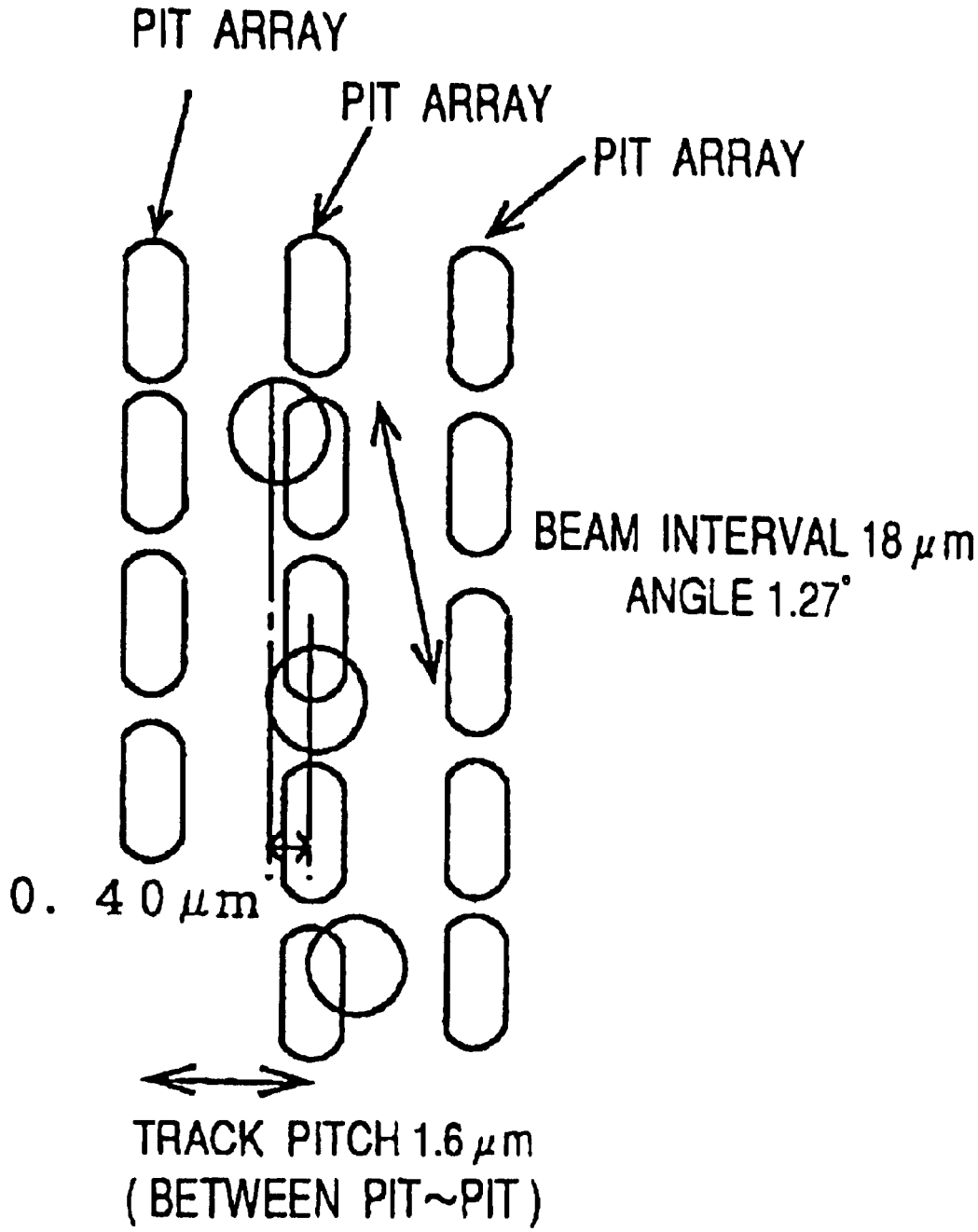
FIG. 7 is a view showing positions of spots on the CD.

As described above, when the DVD-RAM is reproduced, the so-called DPP method is used in order to improve the stability of the tracking error signal. Hereupon, the pitch, direction and depth of the grating 11a formed on the front (primary) surface of the grating element 10 are different from those of the grating 11b formed on the back (secondary) surface of the grating element 10, respectively. In FIGS. 6 and 7, there are shown the spots located on the DVD-RAM and the spots located on the CD, respectively. As shown in FIG. 6, when the DPP method is used as the procedure for detecting the tracking error during the DVD-RAM reproducing process, it is preferable that the so-called sub-beam generated by the diffraction is separated from the reading spot in the radial direction of the disk by the distance equal to ½ (half) of the track pitch (in this case, pitch of land to land). On the other hand, as shown in FIG. 7, because the so-called three beam method is used as the procedure for detecting the tracking error during the CD reproducing process, it is preferable that the so-called sub-beam generated by the diffraction is separated from the reading spot in the radial direction of the disk by the distance equal to ¼ (quarter) of the track pitch (in this case, pitch of pit array to pit array). Accordingly, if the spot intervals (interval between the sub-beam and the reading beam) of the DVD 8a and CD 8b are identical to each other, the track based angle of the grating 11a must be different from that of the grating 11b. Further, because their optical distances from the semiconductor laser 1 are different from each other, the pitches of the gratings 11a, 11b are also different from each other. Regarding to the depths of the gratings, in view of the efficiency for using light, it is advantageous to design the depth of the grating 11a for the DVD in such a manner that the beam coming from the light source 2b for the CD is not diffracted to the best of its ability. Meanwhile, it is advantageous to design the depth of the grating 11b for the CD in such a manner that the beam coming from the light source 2a for the DVD is not diffracted to the best of its ability. Accordingly, it is preferable that the depths of the gratings 11a and 11b are also different from each other. Therefore, in the present embodiment, the optical depth of the grating 11a is set to the value identical to the wave length of 780 nm of the light emitted by the light source 2b for reproducing the CD. In consequence, although the beam having the wave length for reproducing the DVD is diffracted, the beam having the wave length for reproducing the CD is not diffracted. On the other hand, the optical depth of the grating 11b is set to the value identical to the wave length of 650 nm of the light emitted by the light source 2a for reproducing the DVD. In consequence, although the beam having the wave length for reproducing the CD is diffracted, the beam having the wave length for reproducing the DVD is not diffracted.

Figure 9:
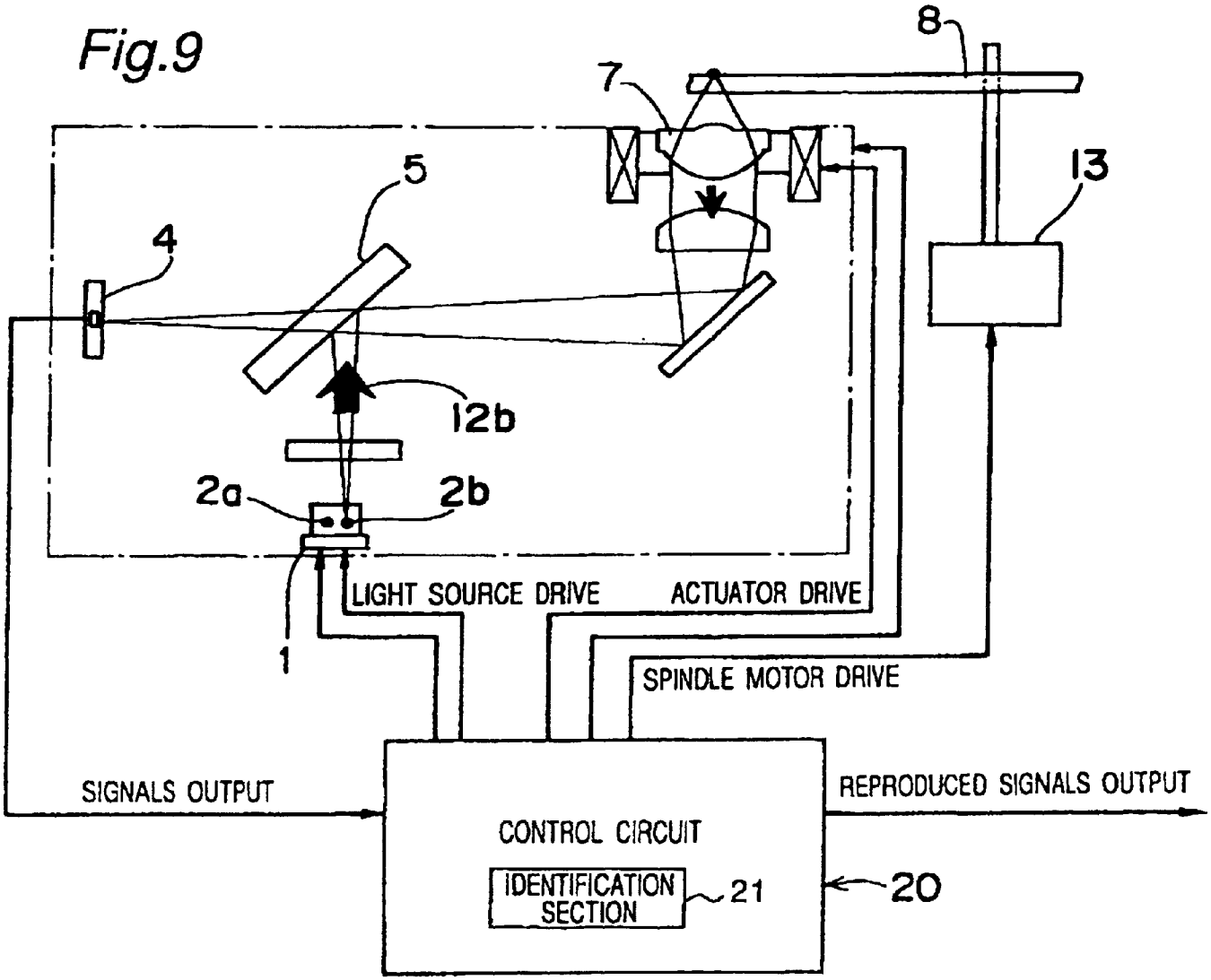
FIG. 9 is a schematic view showing an apparatus for reproducing optical information.

FIG. 9 shows an apparatus for reproducing optical information (optical disk drive), which is provided with the above-mentioned optical head. The optical disk drive can reproduce the information of the CD and the DVD. The control circuit 20 can make the light source 2a or 2b of the semiconductor laser 1 in the optical head emit the beam. In the optical head, the beam emitted by the light source 2a or 2b is reflected by the beam splitter 5 and the mirror 9, and then converged by the convergent lens 3 to become a parallel beam. Thus, a minute light spot is formed onto the optical disk 8 from the parallel beam by the objective lens 7. The reflected beam coming from the optical disk 8 passes through the objective lens 7 and the convergent lens 3, and then is reflected by the mirror 9. Further, the reflected beam passes through the beam splitter 5 and then is detected by the photo detector 4. The control circuit 20 drives a spindle motor 42 to rotate the optical disk 8 on the basis of the electrical signal coming from the quartered detector of the photo detector 4. Further, the control circuit 20 actuates the actuator to perform the tracking control on the optical disk 8. In addition, the control circuit 20 outputs the signals stored in the optical disk 8 to the external device as electrical signals. Because the construction and action of the control system described above is as same as that of the conventional optical disk drive, detailed descriptions as to the control system are omitted.

Although the above-mentioned optical information processor is one for only reproducing use, the above-mentioned optical head can be of course used also for an optical information processor having a storage function.

When the optical information processor is used, it is required that the control circuit 20 identifies the kind of the optical information storage medium (CD or DVD). Various methods of identifying the storage media have been suggested and used. The control circuit 20 is provided with an identification section 21 for identifying whether the storage medium is a CD or DVD using any one of the above-mentioned methods. When an optical information storage medium is set in the processor, the identification section 21 of the control circuit 20 judges the kind of the optical information storage medium. Then, the control circuit 20 makes the light source 2a or 2b in the semiconductor laser 1 emit a light in accordance with the judgement. Thus, the reproducing/storing of the optical information storage is performed.

In the optical head according to the present invention which stores or reproduces the optical information using beams whose wave lengths are different from each other, the light emitting element, in which a plurality of light sources which emit beams with different wave lengths are integrated, is used. In consequence, it may be possible to reduce the number of optical parts such as the beam splitter, etc. so that the optical head may be small-sized while lowering its cost. Accordingly, the apparatus for storing or reproducing the optical information may be also small-sized while lowering its cost.

Although the present invention has been fully described in connection with the preferred embodiments thereof with reference to the accompanying drawings, it is to be noted that various changes and modifications are apparent to those skilled in the at. Such changes and modifications are to be understood as included within the scope of the present invention as defined by the appended claims unless they depart therefrom.

What is claimed is:

1. An optical head comprising:

a light emitting element having *a* plurality of light sources integrally formed, [said] *the* light sources being operable to emit beams having different wave lengths from each other;

an optical system operable to converge a beam emitted by any one of [said] *the* light sources of [said] *the* light emitting element onto an optical information storage medium;

an optical separator operable to separate a reflected beam coming from the optical information storage medium from the beam coming from [said] *the* one of [said] *the* light sources; and a light receiving element operable to detect light quantities of the reflected beam separated by [said] *the* optical separator,

*wherein an aligning direction of the light sources is inclined by about 45 degrees in a rotational direction around an axis of the beam coming from the one of the light sources based on a reflection axis of the optical separator.*

2. The optical head according to claim 1, wherein [said] *the* optical separator is operable to separate the reflected beam coming from the optical information storage medium from the beam coming from [said] *the* one of [said] *the* light sources by reflection and transmission.

[3. The optical head according to claim 2, wherein an aligning direction of said light sources inclines by about 45 degrees in a rotational direction around an axis of the beam coming from said one of said light sources based on of a reflection axis of said optical separator.]

4. The optical head according to claim [3,] *1*, wherein [said] *the* light receiving element is operable to receive a zero-order diffracted light, which is located at a central position, and [said] *the* light receiving element comprises a number of regions at least equal to four times of a number of [said] *the* light sources, [said] *the* regions being grouped as region sets each of which includes four of [said] *the* regions, and each of [said] *the* region sets being operable to receive the reflected beam which has been emitted by [said] *the* one of [said] *the* light sources and then reflected by the optical information storage medium.

5. The optical head according to claim 4, wherein [said] *the* optical separator comprises a parallel plate.

6. The optical head according to claim 1, further comprising an optical element disposed between [said] *the* light sources and [said] *the* optical system, [said] *the* optical element having different diffraction gratings disposed on front and back portions thereof, wherein depths, pitches, and angles for axes of beams of [said] *the* different diffraction gratings are different from each other, respectively.

7. An apparatus for storing and reproducing optical information, [said] *the* apparatus comprising:

a light emitting element having plurality of light sources integrally formed, [said] *the* light sources being operable to emit beams having different wave lengths from each other;

an optical system operable to converge a beam emitted by any one of [said] *the* light sources of [said] *the* light emitting element onto an optical information storage medium;

an optical separator operable to separate a reflected beam coming from the optical information storage medium from the beam coming from [said] *the* one of [said] *the* light sources;

a light receiving element operable to detect light quantities of the reflected beam separated by [said] *the* optical separator; and an electric circuit operable to transform optical signals of [said] *the* light receiving element to electric signals so as to output signals stored in the optical information storage medium as the electric signals,

*wherein an aligning direction of the light sources is inclined by about 45 degrees in a rotational direction around an axis of the beam coming from the one of the light sources based on a reflection axis of the optical separator.*

8. A method of storing and reproducing optical information for an apparatus for storing and reproducing the optical information with an optical head, the optical head including a light emitting element having a plurality of light sources integrally formed, the light sources being operable to emit beams having different wave lengths from each other, an optical system operable to converge a beam emitted by any one of the light sources of the light emitting element onto an optical information storage medium, an optical separator operable to separate a reflected beam coming from the optical information storage medium from the beam coming from the one of the light sources, and a light receiving element operable to detect light quantities of the reflected beam separated by the optical separator, [said] *the* method comprising:

identifying a kind of the optical information storage medium;

making the light emitting element emit a beam having a wave length corresponding to the identified kind of the optical information storage medium and then converging the beam onto the optical information storage medium; and detecting the reflected beam coming from the optical information storage medium and then outputting signals stored in the optical information storage medium as electric signals,

*wherein an aligning direction of the light sources is inclined by about 45 degrees in a rotational direction around an axis of the beam coming from the one of the light sources based on a reflection axis of the optical separator.*

* * * * *